UNITED STATES PATENT OFFICE.

CONSTANTINE BELVESELSKY WARRAND, OF BLUFFTON, SOUTH CAROLINA, ASSIGNOR OF TWO-THIRDS TO CLAVIUS PHILLIPS AND JOHN L. HAMMOND, OF SAVANNAH, GEORGIA.

PROCESS OF EXTRACTING PALMETTO FIBER.

SPECIFICATION forming part of Letters Patent No. 450,120, dated April 7, 1891.

Application filed January 29, 1890. Serial No. 338,520. (No specimens.)

*To all whom it may concern:*

Be it known that I, CONSTANTINE BELVESELSKY WARRAND, a subject of the Queen of Great Britain, residing at Bluffton, in the county of Beaufort and State of South Carolina, have invented certain new and useful Improvements in Processes of Extracting Palmetto Fiber; and I do hereby declare the following to be a full, clear, and exact description of the invention, such as will enable others skilled in the art to which it appertains to make and use the same.

My invention relates to a means of converting the leaves and stems of the dwarf palmetto (*S. Adansonii*) and other members of the genus *Chamærops* into fiber; and it consists in a process of treating the green leaves and stems of the palmetto as will hereinafter fully appear in the specification and be pointed out in the claim.

Palmetto leaves and stems contain more gums and juices insoluble after exposure to the air than any of the other fiber-producing plants, and I have discovered that when the leaves and stems of the palmetto and its congeners begin to dry on exposure to the air after cutting, a chemical change commences in the gums and juices contained therein, whereby it coagulates or hardens and becomes wholly insoluble in water, and cannot be dissolved out of the crude material; but by manipulating the palmetto stock while green no such change occurs, and I am enabled to eliminate the tannin, albumen, gum, glucose, chlorophyl, &c., leaving the clear fiber.

I take the green leaves of the palmetto and divide them by splitting, stripping, or hatcheling into fine shreds. Any of the well-known forms of hatcheling or stripping machines may be used for this purpose, and hence a particular description thereof is not necessary here. The stems are first crushed between rollers and then subjected to the hatcheling machine. A finer and stronger fiber is prepared from the stems of the palmetto than from the leaves, and they may be manipulated separately. After the leaves and stems have been reduced to fine strips or shreds they are placed in vats or receivers of cold water and steeped for several hours. Then a small quantity of caustic soda or its equivalent alkali (about one ounce to a gallon of water) should be introduced and the mass is heated to a point above boiling (212° Fahrenheit) and retained at or above that temperature for six hours, during which time the mass is violently agitated and mixed. The solution should be repeatedly changed during this stage—say hourly—by withdrawing the old and introducing a new supply, and the mass should not be allowed to cool. The alkaline solution removes the silica and renders the fiber soft and pliable, and at the same time, in conjunction with the heat, acts on the soluble gum while the juices are fresh, saponifies and removes it, as well as the albumen, tannin, glucose, and other constituents, all of which are soluble and removable in the juices of the green plant, but become wholly insoluble if allowed to dry.

In experimenting I have found that the gum while the juices of the plant are fresh is soluble and is in the main removed through the agency of the heated alkaline solution, together with the glucose, tannin, and other constituents, which, if allowed to desiccate and oxidize, become wholly insoluble and so completely envelop each fiber as to render decortication or separation impossible, and the remaining portion of the gum (that not carried away in the solution) settles on the surface of the fiber, and when dry forms a bluish-gray powder, which is harmless to the fiber and is readily removed in the process of carding. After the process of elimination is completed and the fiber is sufficiently freed from its incumbrances it is dried by any usual way and is then prepared and ready for the further processes of carding, spinning, and weaving.

Having thus fully described my invention, what I claim therein as new, and desire to secure by Letters Patent of the United States, is—

The process of disintegrating and cleansing the fibrous substance found in green palmetto leaves and stems, said process consisting of first dividing the same into narrow strips or shreds, then subjecting these shreds to a bath of water and afterward to a series of boiling solutions made by dissolving an alkali in water in about the proportions named, and lastly by carding the fiber to remove the powdered gum remaining, all substantially as herein described.

In testimony whereof I affix my signature in presence of two witnesses.

CONSTANTINE BELVESELSKY WARRAND.

Witnesses:
JAS. M. ENNIS,
A. B. PACITTE.